US011948357B2

(12) United States Patent
Landy et al.

(10) Patent No.: US 11,948,357 B2
(45) Date of Patent: Apr. 2, 2024

(54) IMAGE COLORIZATION SYSTEMS AND METHODS

(71) Applicant: NBCUniversal Media, LLC, New York, NY (US)

(72) Inventors: Harvey Landy, Moorpark, CA (US); Samuel Harrell, Harbor Springs, MI (US)

(73) Assignee: NBCUniversal Media, LLC, New York, NY (US)

( * ) Notice: Subject to any disclaimer, the term of this patent is extended or adjusted under 35 U.S.C. 154(b) by 337 days.

(21) Appl. No.: 17/211,537

(22) Filed: Mar. 24, 2021

(65) Prior Publication Data

US 2022/0311981 A1    Sep. 29, 2022

(51) Int. Cl.
*G06K 9/00* (2022.01)
*G06T 7/90* (2017.01)
*G06V 20/40* (2022.01)

(52) U.S. Cl.
CPC ............... *G06V 20/41* (2022.01); *G06T 7/90* (2017.01); *G06T 2200/24* (2013.01); *G06T 2207/20081* (2013.01)

(58) Field of Classification Search
None
See application file for complete search history.

(56) References Cited

U.S. PATENT DOCUMENTS

| 10,936,853 B1* | 3/2021 | Sethi ............... G06V 40/162 |
| 2012/0206475 A1 | 8/2012 | Bryant et al. |
| 2017/0109864 A1* | 4/2017 | Ohba ................ H04N 25/134 |

FOREIGN PATENT DOCUMENTS

EP    3454538 A1    3/2019

OTHER PUBLICATIONS

Frigo et al., "Optimal transportation for example-guided color transfer", 2015 (Year: 2015).*
Hacohen et al., "Non-rigid dense correspondence with applications for image enhancement", 2011 (Year: 2011).*
Cheng, Zezhou et al. "Deep Colorization", 2015 IEEE International Conference on Computer Vision (ICCV), IEEE, Dec. 7, 2015 (Dec. 7, 2015), pp. 415-423, XP032866360.
European Search Report; EP Application No. 22164204.4; dated May 24, 2022.

* cited by examiner

*Primary Examiner* — Soo Jin Park
(74) *Attorney, Agent, or Firm* — Fletcher Yoder, P.C.

(57) ABSTRACT

A non-transitory computer-readable medium includes computer readable instructions, that when executed by one or more processors, causes the one or more processors to perform operations including receiving a plurality of input images and receiving a guide image corresponding to at least one input image of the plurality of input images. The guide image includes additional colorization relative to the at least one input image. Additionally, the operations include generating a color mapping logic configured to adjust a color of the at least one input image to match the additional colorization of the guide image and outputting an indication of the color mapping logic.

16 Claims, 8 Drawing Sheets

IMAGE COLORIZATION SYSTEMS AND METHODS

BACKGROUND

The disclosure relates generally to image colorization systems and methods.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Imagery and videos are typically produced and distributed for viewing on a variety of platforms, such as theater, television, broadcast, and streaming. Certain platforms may benefit from adjustments to the imagery and videos to enhance viewing of the imagery and videos. For example, a size and quality of the imagery and videos may be adjusted. Additionally, imagery and videos may be updated to a higher quality, such as for newer displays that can adequately portray the higher quality. However, such adjustments and updates to the imagery and videos may be a difficult, time-consuming, and costly process. For example, these adjustments may include color alterations that provide a specific look and/or feel to the imagery and videos. Color alterations have traditionally been performed using a very intensive frame-by-frame manual coloration process that is quite costly and time consuming.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a non-transitory computer-readable medium includes computer readable instructions, that when executed by one or more processors, causes the one or more processors to perform operations including receiving a plurality of input images and receiving a guide image corresponding to at least one input image of the plurality of input images. The guide image includes additional colorization relative to the at least one input image. Additionally, the operations include generating a color mapping logic configured to adjust a color of the at least one input image to match the additional colorization of the guide image and outputting an indication of the color mapping logic.

In an embodiment, a system includes one or more hardware processors and a non-transitory memory storing instructions that, when executed by the one or more hardware processors, causes the one or more hardware processors to perform actions including receiving a plurality of input images, determining a plurality of segments of at least one input image of the plurality of input images, receiving one or more guide images including additional colorization relative to the plurality of input images, determining a plurality of guide segments of the one or more guide images that match the plurality of segments of the at least one input image, generating a plurality of lookup tables configured to adjust colors of the plurality of segments of the at least one input image to match the additional colorization of the plurality of guide segments of the one or more guide images, and outputting an indication of the plurality of LUTs.

In an embodiment, a method of adjusting colorization of imagery includes receiving a plurality of input images and receiving a plurality of guide images corresponding to the plurality of input images. The plurality of guide images include additional colorization relative to the plurality of input images. Additionally, the method includes generating one or more LUTs configured to adjust colors of the plurality of input images to match the additional colorization of the plurality of guide images and outputting an indication of the one or more LUTs.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
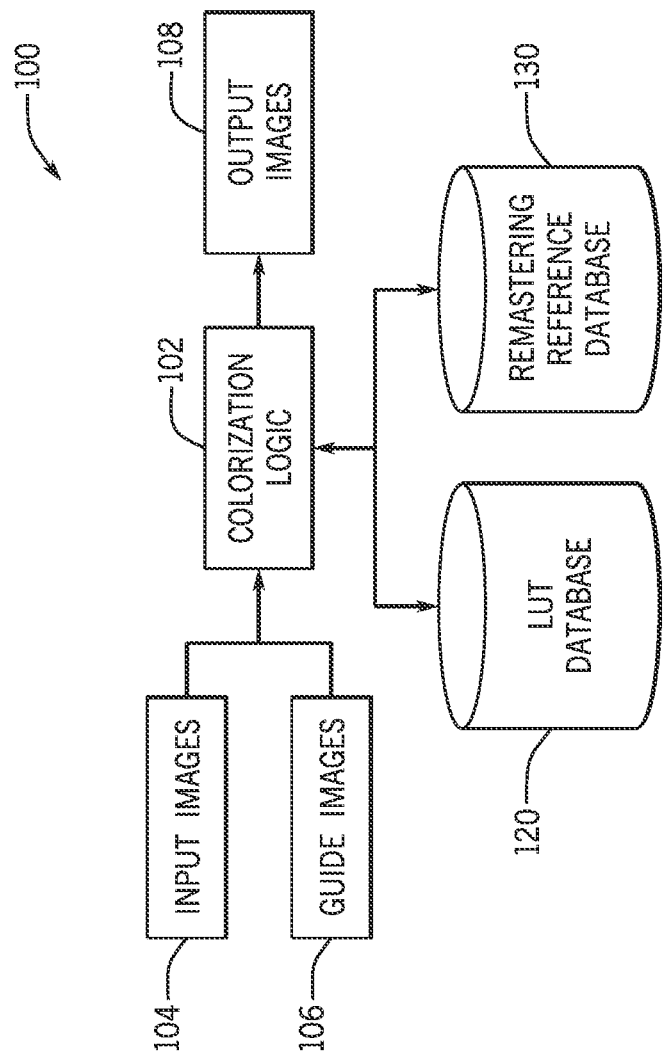
FIG. 1 is a schematic view of an embodiment of a system including colorization logic that generates images and videos based on input images, guide images, and lookup tables, in accordance with one or more current embodiments.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure are generally directed toward systems and methods of image colorization for use in generating images and videos in a new format and/or quality. For example, to produce a video in high dynamic range, a colorization logic of the disclosed systems and methods may adjust a color (e.g., hue, brightness, intensity, saturation, lift, gamma, gain) of input images generally corresponding to the high dynamic range quality to match additional color in a standard dynamic range quality version of the video. The colorization logic may determine a color mapping logic that adjusts the color of the input images to match the additional color and provide an indication of the color mapping logic. The color mapping logic may include one or more lookup tables (LUTs) and/or other color conversion values (e.g., mathematical curves) that adjust a lift, gamma, gain, saturation, hue, and/or other color values of an image. For example, the LUTs may be used by the colorization logic to convert other, similar input images to output images, such as output images of the high dynamic range quality. Each LUT may generally indicate color transformations from one value to another value for several color parameters, such as hue, intensity, brightness, saturation, and other parameters. In certain embodiments, the LUTs may be portrayed as 3-dimensional cubes with each axis of the cube representing a particular color parameter.

The colorization logic may be used in a variety of applications to transform input images. For example, in addition to the conversion from standard dynamic range (SDR) to high dynamic range (HDR), the colorization logic may complete other conversions, such as from standard definition (SD) to high definition (HD) and from HD to ultra-high definition (UHD) (e.g., 4K). Additionally, the colorization logic may transform input images to provide a new version of the images and videos for a new/additional platform, such as theater, television, mobile, broadcast, and streaming. In each conversion, the colorization logic may adjust color of the input images based on guide images that portray a reference indicative of how the color should appear in the new version. As described in greater detail below, such conversions and the generation of LUTs may be completed via artificial intelligence (AI) and/or machine learning. Accordingly, the colorization logic may automatically produce images in a particular format and/or quality with little input or no input from a user.

Turning now to the drawings, FIG. 1 is a schematic view of an embodiment of a system 100 including colorization logic 102 that receives input images 104 (e.g., input frames) and guide images 106 (e.g., guide frames) and that generates output images 108 (e.g., output frames). As illustrated, the system 100 includes a LUT database 120 and a remastering reference database 130. The system 100 may be configured to produce the output images 108 in a particular format and/or quality (e.g., standard definition (SD), HD, UHD, SDR, HDR, theater, broadcast, mobile, television, streaming) with accurate and adjusted coloring (e.g., hue, brightness, intensity, saturation). For example, as described in greater detail below, the colorization logic 102 may use AI and/or machine learning to produce such output images 108.

The input images 104 received by the colorization logic 102 may be a set of images in a new (e.g., additional, other) format relative to an existing version of the images. For example, a version of a movie may exist in SDR, and the input images 104 may be a high resolution scan of film of the movie that has not been previously color adjusted for an intended playback format (e.g., a new high resolution version). The high resolution scan may include some coloring but may not have accurate/desired coloring in some instances. For example, an original version of the movie prior to final approval by a director (e.g., a base scan of the film) may include different color schemes and/or color patterns in a single scene or across multiple scenes. The coloring in the movie may be adjusted, such as by a colorist, prior to its release based on input from the director and based on the general color scheme of the movie and/or color schemes for certain types of scenes. This coloration may give content a unique "feel" or characterization, adding to the quality of the content. However, because a new playback format is being generated, the content in the new playback format may require new color alterations.

The colorization logic 102 may automate this coloration process by adjusting the color of the high resolution scan (e.g., the input images 104) to produce the output images 108. The high resolution scan may be a scan of the film prior to the original adjustments to the color.

The guide images 106 received by the colorization logic 102 may be images that generally correspond to the input images 104 and that include additional color alterations indicative of the desired colorization, relative to the input images 104. In the example of generating a new HDR version of a movie, the guide images 106 may be the SDR version of the movie that has already been color adjusted from the base scan of the film (e.g., the original version that had not been color adjusted). In this example, each input image 104 may correspond to a single, unique guide image 106. The unique guide image 106 may be used by the colorization logic 102 to generate a LUT and to convert the input image 104 into a corresponding output image 108 with additional color.

In some instances, there may be more than a single, unique guide image 106 to provide guidance for adjusting color of the corresponding input image 104. For example, the input images 104 may be for video content, such as a movie or television show, that has not previously been color adjusted. The guide images 106 in such instances may be provided by a user and/or may be retrieved by the colorization logic 102 from the remastering reference database 130. As described in greater detail below, the system 100 may include or provide a graphical user interface (GUI) allowing the user to view the input images 104, the guide images 106, and the output images 108. Additionally, the GUI may allow the user to provide inputs, such as providing or creating the guide images 106, matching the guide images 106 to certain input images 104, confirming suggested matches of the guide images 106 to certain input images 104 (e.g., matches suggested by the colorization logic 102), revising the output images 108 generated by the colorization logic 102, and other suitable inputs and user interactions.

The remastering reference database 130 may store images and/or videos that may be retrieved by the colorization logic 102 to be used as the guide images 106. For example, the colorization logic 102 may compare the input images 104 (e.g., features of the input images 104) to images stored in the remastering reference database 130 (e.g., features of such images) to determine/identify the guide images 106 that match the input images 104. The colorization logic 102 may then generate the output images based on those guide images 106. Matching of the input images 104 to the guide images 106 is described in greater detail below in reference to FIG. 4. The method described in FIG. 4 may apply to both the situation in which each input image 104 corresponds to a unique guide image 106 and the situation in which multiple input images 104 correspond to a single guide image 106.

The colorization logic 102 may generate the output images 108 based on the input images 104 and the guide images 106 by determining a color mapping logic (e.g., LUTs) that adjust the color of the input images 104 to match the additional color adjustments indicated by the guide images 106. For example, as described below in reference to FIG. 5, the colorization logic 102 may receive/identify an input LUT, such as via the GUI provided by the system 100. In certain embodiments, the colorization logic 102 may retrieve the input LUT from the LUT database 120. In some embodiments, the colorization logic 102 may retrieve the input LUT based on parameters associated with the input images 104 and/or the guide images 106, such as parameters indicating a type of scene (e.g., day, night, indoor, outdoor) in the input images 104 and/or the guide images 106. The LUT database 120 may store multiple LUTs with each LUT corresponding to a certain type of scene. Each LUT may include color variables specific to the type of scene, such as variations in hue, brightness, intensity, saturation, and other color variables. In some embodiments, the input LUT may be a default LUT that is the same each time the colorization logic 102 converts the input images 104 to the output images 108. For example, the input LUT may provide a base colorization for the entire content of the input images 104.

The colorization logic 102 may provide an indication of the generated color mapping logic (e.g., generated LUTs) and/or may output the output images 108 to which colorization may already be applied based on a generated LUT. The indication of the generated LUTs and/or the output images 108 may be displayed via the GUI described herein. For example, the GUI may display each LUT as a 3-dimensional cube with each axis of the cube representing a particular color parameter, such as hue, brightness, intensity, and/or saturation. In certain embodiments, a user may adjust a generated LUT via the GUI, such as to adjust one or more color parameters of the LUT.

In certain embodiments, the generated LUTs may be used by the colorization logic 102 to convert other input images 104 to a plurality of output images 108 with desired colorization. For example, if a LUT is generated for a first input image/frame 104, the LUT may be used to convert a second, subsequent input image/frame 104. The LUT may facilitate converting the second input image 104 without using the guide images 106 due to a similarity (e.g., an overlapping characteristic) between the first input image 104 and the second input image 104. The second input image 104 may have some or all of the same features as the first input image 104, such that the colorization logic 102 may transform the second input image 104 into a second output image 108 using the LUT determined for the first input image 104. For example, the second input image 104 may sequentially follow the first input image 104 in a video, and/or the second input image 104 may be for a type of scene similar to the first input image 104.

Although most embodiments disclosed herein describe generating LUTs and applying those LUTs to input images to generate output images, other forms of color mapping logic may be generated, provided, and/or used by the colorization logic 102. For example, the other color mapping logic may include adjustments for lift, gamma, gain, saturation, hue, and/or other color values of an input image to generate an output image. Such adjustments may be determined via machine learning and/or may be stored in the LUT database 120 or another suitable database for retrieval by the colorization logic 102. In certain embodiments, LUTs may indicate at least some of these adjustments, and/or LUTs may be generated and/or used by the colorization logic 102 in addition to these adjustments.

In certain embodiments, the colorization logic 102 may store the output images 108 in the remastering reference database 130 for use as the guide images 106 in converting other input images 104. For example, the output images 108 may indicate how certain features or types of scenes should be adjusted/colored, such that the output images 108 may provide guidance in generating other LUTs and converting the other input images 104.

An example use of the system 100 is to generate a new HDR version of a movie that was previously only available in SDR. In this example, the SDR version may provide the guide images 106 that indicate an appropriate colorization of the movie as a final product. A new scan of the original film (prior to the appropriate colorization of the SDR version) may be the input images 104. Accordingly, each input image 104 may directly match to a single, unique guide image 106, such that the colorization logic 102 may adjust the color of each input image 104 to match the unique, corresponding guide image 106. The colorization logic 102 may generate a LUT for the conversion of the first input image 104 of the new scan to generate a first output image 108 for the new HDR version. The colorization logic 102 may then use the LUT to convert subsequent input images 104 of the new scan, such as subsequent input images 104 belonging to the same scene as the first input image 104. For each new scene of the movie, the colorization logic 102 may generate a LUT for the first input image 104 of the scene and use the LUT to generate the output images 108 for the rest of scene.

In another example, the system 100 may generate one or more LUTs for a television series (e.g., an episodic series) or a movie series and use the LUTs for future episodes of the television series and/or future movies of the movie series. Specifically, the colorization logic 102 may follow the method described in reference to FIG. 2 below to identify and/or generate a LUT for each type of scene in a particular episode/movie and provide an indication of the generate LUT. The colorization logic 102 may then provide colorization adjustments for a new episode/movie using the LUTs generated for the previous, particular episode/movie. Accordingly, the colorization logic 102 may facilitate production of new episodes/movies of a series that has recurring settings or types of scenes. This example is described in greater detail below in reference to FIG. 8.

Additionally, the colorization logic 102 may train a machine learning model based on the generated LUTs, the guide images, and/or the generated output images described above, among other factors. For example, the colorization logic 102 may access the generated LUTs, the guide images, and/or the generated output images. Additionally, the colorization logic 102 may access user inputs provided to the GUI described herein, such as approvals of the generated LUTs and/or the generated output images. Based on this access and analysis, the colorization logic 102 may identify patterns, correlations, or trends associated with the data, such as common attributes of the generated LUTs and/or the generated output images. Accordingly, the colorization logic 102 may generate a trained model based on the analysis, and the trained model may facilitate matching other guide images to input images, generating additional LUTs, and generating additional output images. As used herein, machine learning may refer to algorithms and statistical models that computer systems use to perform a specific task with or without using explicit instructions. For example, a machine learning process may generate a mathematical model based on a sample of the output data set, known as "training data," in order to make predictions or decisions without being explicitly programmed to perform the task.

Depending on the inferences to be made, the machine learning of the data colorization logic 102 may implement different forms of machine learning. For example, in some embodiments, supervised machine learning may be implemented. In supervised machine learning, the mathematical model of a set of data contains both the inputs and the desired outputs. This data is referred to as "training data" and is essentially a set of training examples. Each training example has one or more inputs and the desired output, also known as a supervisory signal. In a mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task. Examples of matching learning techniques include logistic regression, random forest, decision tree, gradient boosted tree, nearest neighbors, Naive Bayes, and other suitable techniques.

Supervised learning algorithms include classification and regression. Classification algorithms are used when the outputs are restricted to a limited set of values, and regression algorithms are used when the outputs may have any numerical value within a range. Similarity learning is an area of supervised machine learning closely related to regression and classification, but the goal is to learn from examples using a similarity function that measures how similar or related two objects are. It has applications in ranking, recommendation systems, visual identity tracking, face verification, and speaker verification.

Additionally and/or alternatively, in some situations, it may be beneficial for the machine-learning circuitry to utilize unsupervised learning (e.g., when particular output types are not known). Unsupervised learning algorithms take a set of data that contains only inputs, and find structure in the data, like grouping or clustering of data points. The algorithms, therefore, learn from test data that has not been labeled, classified or categorized. Instead of responding to feedback, unsupervised learning algorithms identify commonalities in the data and react based on the presence or absence of such commonalities in each new piece of data.

Cluster analysis is the assignment of a set of observations into subsets (called clusters) so that observations within the same cluster are similar according to one or more predesignated criteria, while observations drawn from different clusters are dissimilar. Different clustering techniques make different assumptions on the structure of the data, often defined by some similarity metric and evaluated, for example, by internal compactness, or the similarity between members of the same cluster, and separation, the difference between clusters. Other methods are based on estimated density and graph connectivity.

Figure 2:
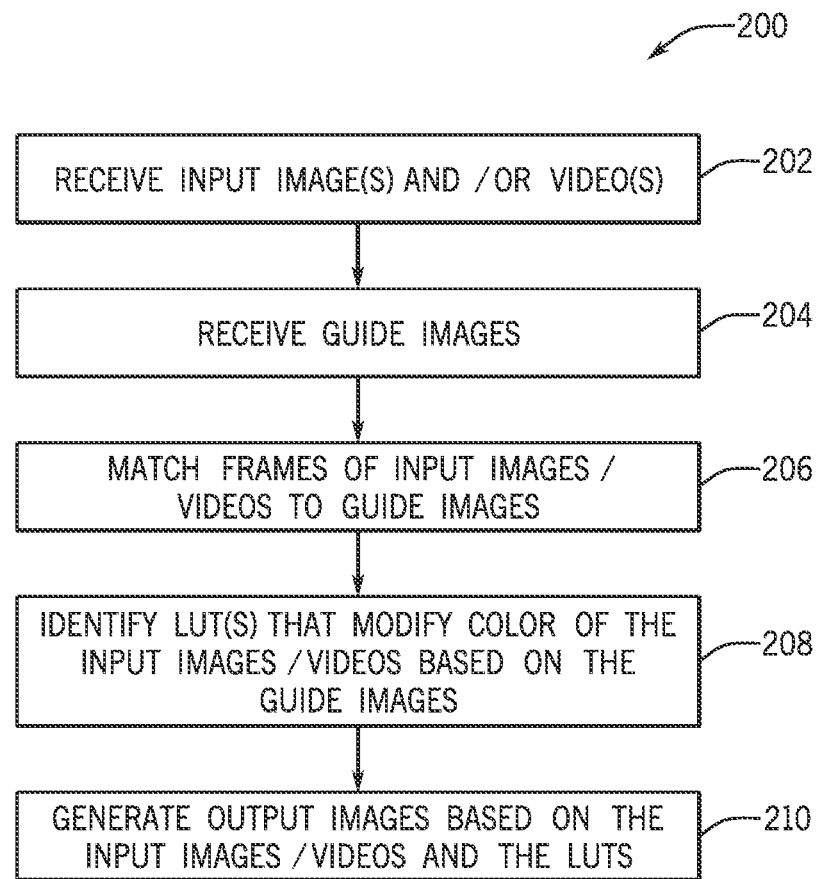
FIG. 2 is a flow diagram depicting an embodiment of a method that may be performed by the colorization logic of FIG. 1, in accordance with one or more current embodiments.

With the preceding in mind, FIG. 2 is a flow diagram depicting an embodiment of a method 200 that may be performed by the colorization logic 102 of FIG. 1. While the method 200 is described using steps in a specific sequence, it should be understood that the present disclosure contemplates that the described steps may be performed in different sequences than the sequence illustrated, and certain described steps may be skipped or not performed altogether. In some embodiments, the method 200 may be implemented by executing instructions stored in a tangible, non-transitory, computer-readable medium, such as a memory device (e.g., one or more memory devices), using a processor (e.g., one or more processors). For example, the one or more memory devices may store instructions for executing the colorization logic 102, and the one or more processors may execute such instructions.

As illustrated, in block 202, the processor, via the colorization logic 102, may receive the input images 104 and/or videos having the input images 104. As described above, the input images 104 may be a set of images in a new format relative to an existing version of the images, such as a high resolution scan of film of a movie that has not been color adjusted. In other embodiments, the input images 104 may be an initial version of a movie or television show that requires color adjustments prior to release.

In block 204, the processor, via the colorization logic 102, may receive guide images 106 (e.g., guide frames) that generally correspond to the input images 104 and that include additional color (e.g., an altered colored scheme) relative to the input images 104. The colorization logic 102 may receive a guide image 106 corresponding to each input image 104 or may receive a lesser amount of guide images 106, such that some guide images are used for multiple input images 104 and/or some input images 104 may not have a corresponding guide image 106. In some embodiments, the colorization logic 102 may receive more guide images 106 than input images 104. In certain embodiments, the guide images 106 may be images that are manually colorized by a colorist and provided to the system 100, such as via the GUI of the system 100 (e.g., the GUI may receive an input indicative of the guide images 106). In other embodiments, the guide images 106 may be content that was previously colorized (e.g., that have altered color) and retrieved from a database (e.g., the remastering reference database 130).

In block 206, the processor, via the colorization logic 102, matches the input images 104 to the guide images 106. As described in greater detail in reference to FIG. 4, the colorization logic 102 may identify features of the input images 104 and features of the guide images 106 and match the two sets of features to match the input images 104 to the guide images 106. Such features may include objects within each image, such as people, buildings, furniture, scenery, and other objects that may be included in a scene. In certain embodiments, the matching operation of block 206 may be omitted, such as in embodiments where a guide image 106 was used for a previous input image 104 to generate a LUT (and/or another color mapping logic). The generated LUT may be used and/or transformed for the subsequent input image 104 without matching the subsequent input image 104 to a guide image 106.

In block 208, the processor, via the colorization logic 102, identifies or generates LUTs that modify (e.g., adjust) color of the input images 104 based on the guide images 106. As described in greater detail in reference to FIG. 5, the colorization logic 102 may receive input LUTs and transform the input LUTs based on the input images 104 and the guide images 106, such as based on a difference in color parameters between the input images 104 and the guide images 106. After generating the LUTs, the colorization logic 102 may store the LUTs in the LUT database 120 and/or may provide an indication of the generated LUTs via the GUI of the system 100. In some embodiments, rather than generating new LUTs, the colorization logic 102 may retrieve LUTs from the LUT database 120 to modify the color of the input images 104. The colorization logic 102 may iteratively apply LUTs from the LUT database 120 until the input images 104 match the guide images 106, such as within a threshold level of similarity.

In block 210, the processor, via the colorization logic 102, generates the output images 108 based on the input images 104 received at block 202 and the LUTs generated at block 208. As described above, the colorization logic 102 may provide the output images 108 for display via the GUI of the system 100. A user may view the generated output images 108 and/or may further revise color and other aspects of the output images 108 via the GUI.

Figure 3:
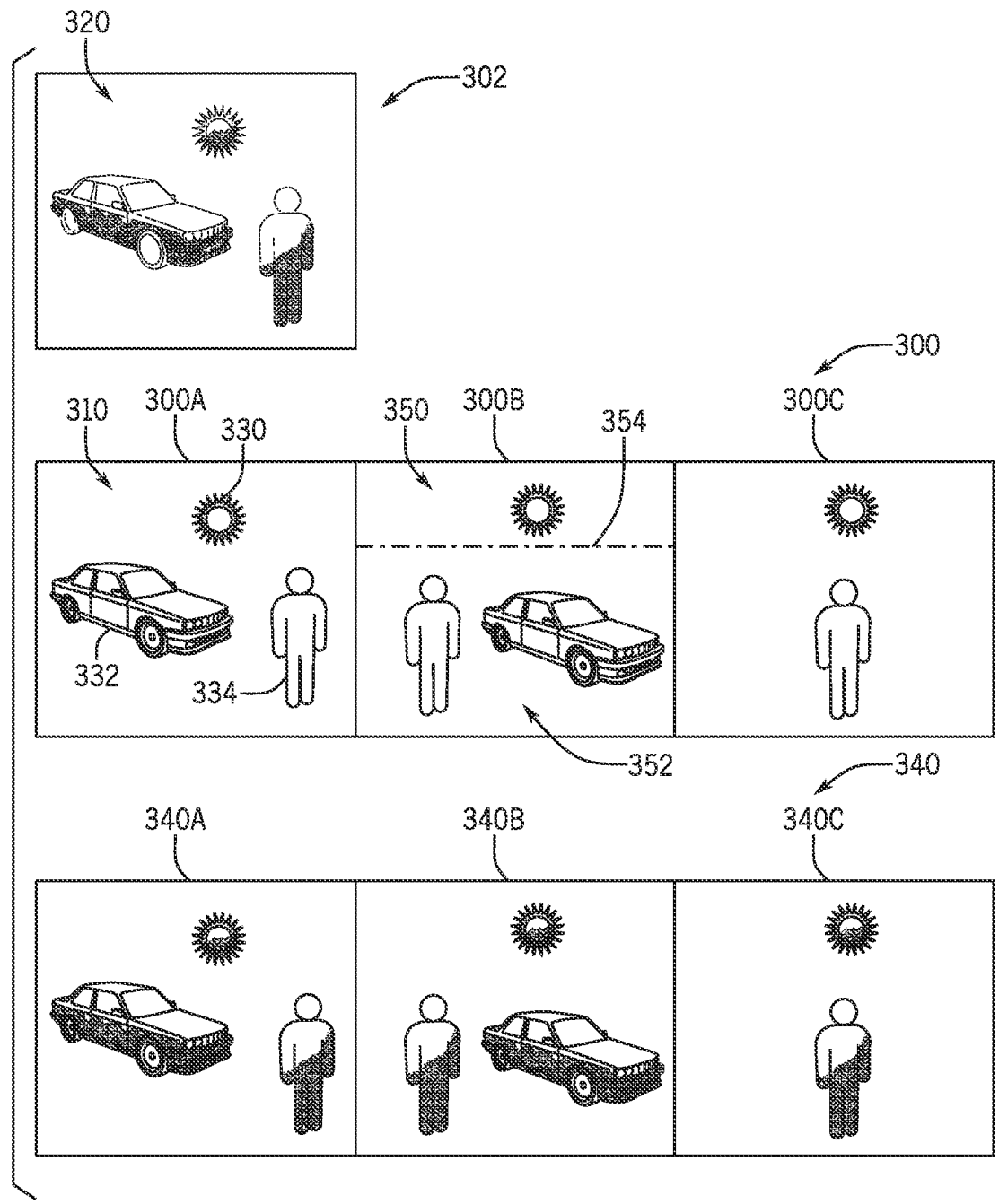
FIG. 3 is a block diagram depicting an embodiment of input images that may be matched to a guide image by the colorization logic of FIG. 1 to generate output images, in accordance with one or more current embodiments.

FIG. 3 is a block diagram depicting an embodiment of input images 300 that may be matched to a guide image 302 by the colorization logic 102 of FIG. 1. As illustrated, the input images 300 include a first input image 300A, a second input image 300B, and a third input image 300C that may be sequential images (e.g., frames) of a video. For example, the input images 300 may be a high resolution scan of film. The input images 300 generally do not include shading. In some embodiments, the input images 300 may include some colorization and/or shading. However, for illustration purposes, such shading is omitted in the illustrated embodiment. The guide image 302 includes additional/adjusted colorization relative to the input images 300, as indicated by additional/different shading in the guide image 302. Additionally, the guide image 302 is a lower resolution relative to the input images 300, as indicated by broken lines of the objects within the guide image 302 and lesser detail in the guide image 302 relative to the input images 300.

The colorization logic 102 may match the guide image 302 to one or more of the input images 300. For example, the colorization logic 102 may compare features 310 of the input images 300 to features 320 of the guide image 302 to match the guide image 302 to a particular input image 300. The features 310 and the features 320 may generally be aspects of the input images 300 and the guide image 302, respectively, that uniquely identify and characterize the images. As illustrated, the features 310 and the features 320 include the Sun 330, a car 332, and a person 334. In other embodiments, features of input images and/or guide images may include other objects, such as structures, furniture, signs, animals, outer space objects (e.g., other than the Sun), and other suitable objects. Additionally, features may include scenery, weather, a time of day, contrast ranges within a single image, hue ranges within a group of images (e.g., a scene), and other suitable features. In yet other embodiments, features of input images and/or guide images may include metadata associated with the input images and/or guide images.

Figure 4:
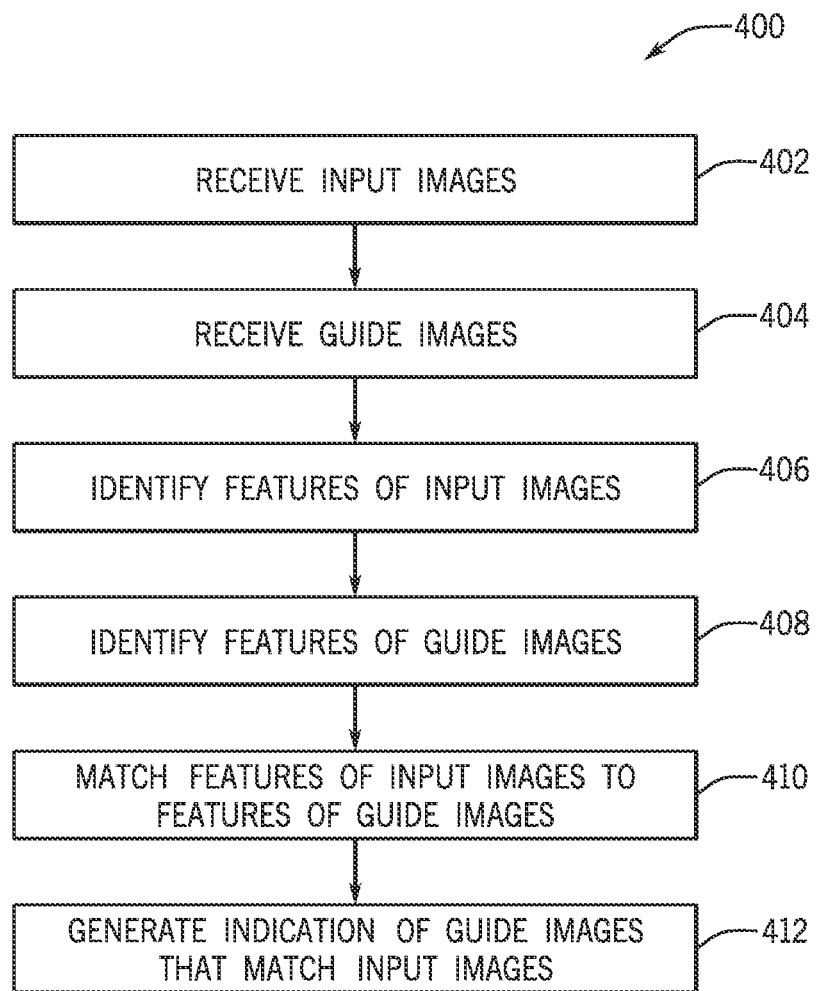
FIG. 4 is a flow diagram depicting an embodiment of a method that may be performed by the colorization logic of FIG. 1, in accordance with one or more current embodiments.

The process of matching the guide image 302 to the input images 300, as described in reference to FIG. 4, may include identifying the features 310 and the features 320 and a position/orientation of the features 310 and the features 320 in each image. In the illustrated embodiment, the colorization logic 102 may match the guide image 302 to the first input image 300A based on positions/orientations of the features 310 being similar to positions/orientations of the features 320. In some embodiments, the colorization logic 102 may determine that the guide image 302 matches the first input image 300A, or other input images, based on the guide image 302 and the first input image 300A being within a threshold level of similarity (e.g., a difference between the guide image 302 and the first input image 300A being less than a threshold difference). The colorization logic 102 may determine the threshold level of similarity based on a type of the guide image 302 (e.g., a type of scene in the guide image 302), a type of the first input image 300A (e.g., a type of scene in the first input image 300A), an amount of the features 310, an amount of the features 320, and/or based on other suitable factors.

In some embodiments, the colorization logic 102 may provide a recommendation of the suggested/matched guide images and input images via the GUI of the system 100. For example, the GUI may display the input images 300 and the guide image 302 as illustrated in FIG. 3 with the guide image 302 generally below and aligned with the first input image 300A to indicate that the guide image 302 is matched to the first input image 300A. As described in reference to FIGS. 6 and 7, the colorization logic 102 may request user approval of the matched guide images and input images prior to proceeding with generating one or more LUTs for the input images and generating output images corresponding to the input images. In other embodiments, the colorization logic 102 may proceed to generate the LUTs and output images independent of user input.

In certain embodiments, the colorization logic 102 may align the guide image 302 and the first input image 300A prior to generating the LUT for the first input image 300A, such as to account for cropping of the guide image 302 and/or the first input image 300A. In some embodiments, the colorization logic 102 may determine that an alignment between the guide image 302 and the first input image 300A is within a threshold alignment to determine that the guide image 302 matches the first input image 300A.

After matching the guide image 302 to the first input image 300A, the colorization logic 102 may generate a LUT (and/or other color mapping logic) that adjusts the color of the first input image 300A to generally match the additional color of the guide image 302. For example, the colorization logic 102 may receive an input LUT and transform the input LUT based on the additional color of the guide image 302. In certain embodiments, the colorization logic 102 may retrieve the LUT from the LUT database 120. In some embodiments, the colorization logic 102 may determine the LUT to be retrieved based on a color scheme of the first input image 300A, a color scheme of the guide image 302, types of the features 310, types of the features 320, and other suitable factors.

The colorization logic 102 may iteratively adjust the input LUT applied to the first input image 300A to adjust the color of the first input image 300A until a difference between the color of the first input image 300A and the color of the guide image 302 is less than a threshold difference and/or based on a cost function. For example, the colorization logic 102 may use a cost function such as a peak signal-to-noise ratio (PSNR) and/or a structural similarity index (SSIM). After determining the LUT for the first input image 300A, the colorization logic 102 may provide an indication of the LUT. In certain embodiments, the colorization logic 102 may then apply the LUT to the first input image 300A to generate a first output image 340A corresponding to the first input image 300A.

Figure 8:
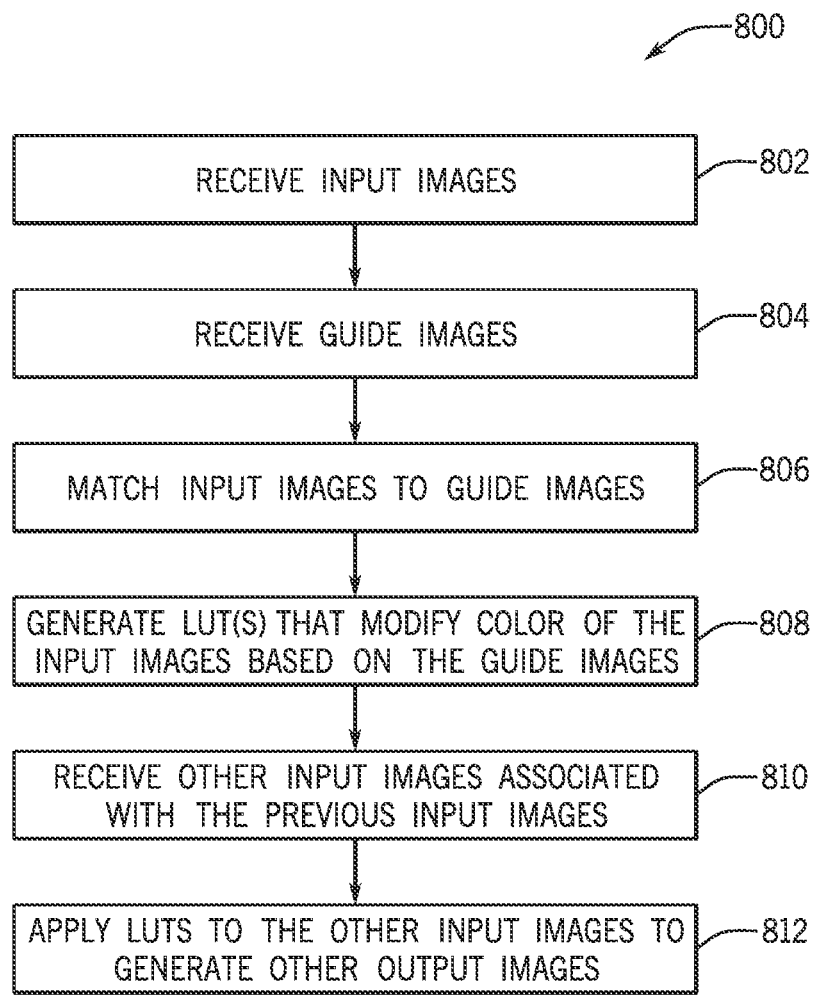
FIG. 8 is a flow diagram depicting an embodiment of a method that may be performed by the colorization logic of FIG. 1, in accordance with one or more current embodiments.

Additionally or alternatively, as described in reference to FIG. 8, the colorization logic 102 may apply the LUT to the second input image 300B and/or the third input image 300C to adjust the color of the additional, subsequent input images and generate a second output image 340B and a third output image 340C. For example, the LUT generated for the first input image 300A may be used as an input LUT to adjust the color of the second input image 300B. The colorization logic 102 may determine whether to use the LUT generated for the previous input image (e.g., the first input image 300A) based on a determination that the previous input image is part of the same scene as the current input image (e.g., the second input image 300B or the third input image 300C) and/or based on the current input image being within a threshold level of similarity relative to the previous input image (e.g., the features 310 being within a threshold position and/or a threshold orientation between the two images, the features 310 being with a threshold color between the two images). After determining that the previous LUT should be used for the second input image 300B, the colorization logic 102 may apply the LUT to the second input image 300B to generate the second output image 340B.

In certain embodiments, the colorization logic 102 may further adjust/transform the LUT based on the second input image 300B (e.g., based on the color and/or position of the features 310 in the second input image 300B). Accordingly, the LUT generated for the second input image 300B may be the same or may be different from the LUT generated for the first input image 300A. The LUT for the second input image 300B may then be provided as an input LUT for the third input image 300C, and the process may be repeated for the third input image 300C and additional, subsequent input images to adjust color of the third input image 300C and the additional, subsequent input images. Using the LUT generated for the previous input image 300 may facilitate adjusting the color of the subsequent input images 300, because the colorization logic 102 will not have to compare the subsequent input images 300 to the guide image 302. Instead, rather than generating a completely new LUT, the colorization logic 102 may apply the previous LUT to the subsequent input images 300 to generate the output images 340.

As illustrated, the features 310 of the input images 300 generally include more detail than the features 320 of the guide image 302, such that the input images 300 may be a higher resolution scan that may illustrate these additional details. For example, in the input images 300, hubcaps of the car 332 are visible, whereas the hubcaps are generally not as visible in the guide image 302. These additional details of the input images 300 are also present in the illustrated output images 340.

In some embodiments, the colorization logic 102 may identify segments (e.g., areas or portions) within the input images 300 and determine multiple, different LUTs for the segments. For example, one or more segments may have a first LUT, and one or more other segments may have a second LUT. Some input images, such as the input images 300, may benefit from segmentation due to color parameters (e.g., hue, brightness, intensity, saturation) of portions of the input images being significantly different from one another. A first portion of an input image may be significantly brighter and/or have a different color scheme relative to another portion, such that the two portions may benefit from different LUTs to generate an output image including segments corresponding to the two portions. In the illustrated embodiment, the colorization logic may identify a first segment 350 and a second segment 352 of the input images 300, as indicated by dashed line 354. The dashed line 354 is included for illustration purposes to show the first segment 350 and the second segment 352. In certain embodiments, the colorization logic 102 may generate the dashed line 354 for viewing via the GUI of the system 100 to allow a user to confirm that the input images 300 should be segmented into the first segment 350 and the second segment 352 or otherwise segmented accordingly variations in color parameters.

In the illustrated embodiment, the first segment 350 includes the Sun 330 and other portions of the sky. The second segment 352 includes the car 332, the person 334, and other portions of the foreground. The colorization logic 102 may automatically identify the first segment 350 and the second segment 352 due to color variations between the segments. In certain embodiments, the colorization logic 102 may determine that a difference in one or more color parameters (e.g., hue, brightness, intensity, saturation) between the two segments is greater than a threshold to difference to determine that the input images 300 should be segmented. In another embodiment, the colorization logic 102 may identify the first segment 350 and the second segment 352 based on metadata associated with each segment. The colorization logic 102 may follow the method described in reference to FIG. 3 for each segment to determine a LUT for each segment and to generate output images including adjusted color in each segment. In some embodiments, the colorization logic 102 may determine a LUT and adjust color for only a portion, but not all of the segments of the input images. In such cases, the colorization of the other portions may remain unchanged or may be changed based upon alternative LUT(s). For example, some segments may not require color adjustment to match the guide image 302 or may require an alternative colorization not provided by a first identified LUT. In certain embodiments, the colorization logic 102 may clamp or unclamp portions and/or segments of the input images to allow color of those portions/segments to adjust differently relative to other portions. For example, in an embodiment of converting the input images 300 to HDR, the colorization logic 102 may unclamp a portion/segment including the Sun 330 (e.g., a portion/segment smaller than the first segment 350) to allow the portion/segment to adjust more than other portions/segments. When converting to HDR, the Sun 330 may adjust to a brightness of approximately 10,000 Nits. In certain embodiments, a brightness of an object and/or a segment of the input images may be adjusted by the colorization logic 102 to a brightness between 1,000 Nits and 11,000 Nits, between 2,000 Nits and 10,000 Nits, to approximately 9,000 Nits, approximately 4,000 Nits, and to other suitable brightnesses and brightness ranges. Without unclamping the Sun 330, the adjustment when converting to HDR may be more limited, such that the conversion may realize the full potential of HDR.

In some embodiments, the colorization logic 102 or a different logic of the system 100 may apply other LUTs to the output images 340 (e.g., after applying the LUTs described above). The other LUTs may be specific to camera systems to compensate for camera system settings, specific to end user devices, and to account for other system settings involved in the capture and/or display of the output images 340.

FIG. 4 is a flow diagram depicting an embodiment of a method 400 that may be performed by the colorization logic 102 of FIG. 1. While the method 400 is described using steps in a specific sequence, it should be understood that the present disclosure contemplates that the described steps may be performed in different sequences than the sequence illustrated, and certain described steps may be skipped or not performed altogether. In some embodiments, the method 400 may be implemented by executing instructions stored in a tangible, non-transitory, computer-readable medium, such as a memory device (e.g., one or more memory devices), using a processor (e.g., one or more processors).

In block 402, the processor, via the colorization logic 102, may receive input images, such as the input images 104 and/or the input images 300. The operation of block 402 may be similar to operation of block 202. In block 404, the processor, via the colorization logic 102, may receive guide images, such as the guide image 106 and/or the guide image 302. The operation of block 404 may be similar to operation of block 204.

In block 406, the processor, via the colorization logic 102, may identify features of the input images. For example, as described above in reference to FIG. 3, the colorization logic 102 may identify the features 310 of the input images 300 and positions, sizes, shapes, orientations, color, shading, and other aspects of the features 310.

In block 408, the processor, via the colorization logic 102, may identify features of the guide images. For example, as described above in reference to FIG. 3, the colorization logic 102 may identify the features 320 of the guide image 302 and positions, sizes, shapes, orientations, color, shading, and other aspects of the features 320. In certain embodiments, the colorization logic 102 may identify features of the input images and/or features of the guide images via machine learning.

In block 410, the processor, via the colorization logic 102, may match features of the input images to features of the guide images. For example, as described above in reference to FIG. 3, the colorization logic 102 may match the features 310 of the input images 300 to features 320 of the guide image 302. The colorization logic 102 may match the features based on the features being in the same relative positions in the images, based on differences in positions of the features between the input images and the guide images being within a threshold difference, and/or based on sizes, shapes, orientations, colors, and/or shading being the same or within a threshold level of one another between the input images and the guide images. In certain embodiments, the colorization logic 102 may compare the features to multiple threshold values, such as a first threshold related to relative positions of features, a second threshold related to colors of the features, and/or a third threshold related to a number of features that must be matched between the input images and the guide images to actually match the input images to the guide images.

In block 412, the processor, via the colorization logic 102, generates an indication of the guide images that match respective input images. In the embodiment of FIG. 3, the colorization logic 102 may generate an indication that the guide image 302 matches the first input image 300A based on the features 310 of the first input image 300A matching the features 320 of the guide image 302. The GUI of the system 100 may display the indication, such as by displaying the guide image 302 below and aligned with the first input image 300A (e.g., as illustrated in FIG. 3). A user of the GUI may view the suggested/matched guide image 302 and approve the guide image 302 to allow the colorization logic 102 to proceed to generate one or more LUTs for the input images 300 and to generate output images based on the LUTs. In some embodiments, the colorization logic 102 may generate the LUTs and output images independent of user input and/or independent of providing the indication of the matched guide images and input images. This matching process as described with respect to block 410 may be performed in whole or in part using machine learning, including supervised machine learning where user input provides feedback as to the accuracy of the match.

Figure 5:
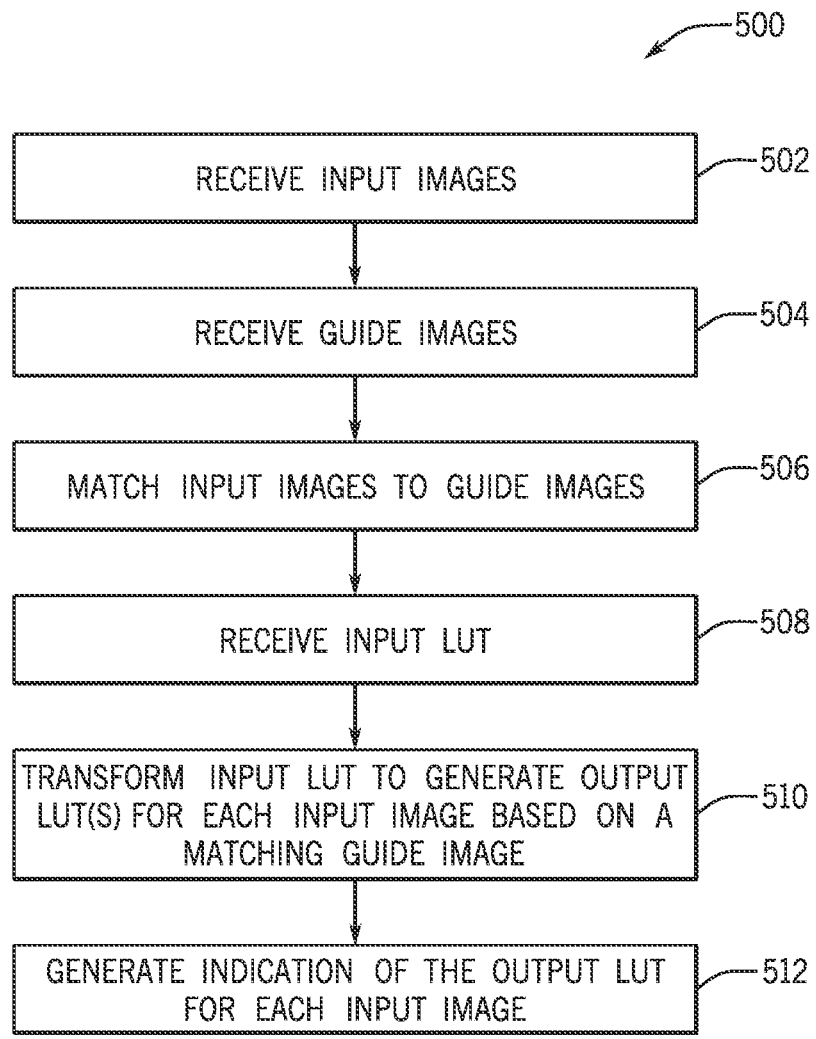
FIG. 5 is a flow diagram depicting an embodiment of a method that may be performed by the colorization logic of FIG. 1, in accordance with one or more current embodiments.

FIG. 5 is a flow diagram depicting an embodiment of a method 500 that may be performed by the colorization logic 102 of FIG. 1. While the method 500 is described using steps in a specific sequence, it should be understood that the present disclosure contemplates that the described steps may be performed in different sequences than the sequence illustrated, and certain described steps may be skipped or not performed altogether. In some embodiments, the method 500 may be implemented by executing instructions stored in a tangible, non-transitory, computer-readable medium, such as a memory device (e.g., one or more memory devices), using a processor (e.g., one or more processors).

In block 502, the processor, via the colorization logic 102, may receive input images, such as the input images 104 and/or the input images 300. The operation of block 502 may be similar to operation of block 202. In block 504, the processor, via the colorization logic 102, may receive guide images, such as the guide image 106 and/or the guide image 302. The operation of block 504 may be similar to operation of block 204. In block 506, the processor, via the colorization logic 102, may match the input images to the guide images. For example, the operation of block 506 may be similar to the method 400 described in reference to FIG. 4.

In block 508, the processor, via the colorization logic 102, may receive an input LUT. The input LUT may be received and/or identified via the GUI of the system 100 or may be retrieved by the colorization logic 102 based on parameters (e.g., characteristics) associated with the input images and/or the guide images, such as parameters indicating a type of scene in the input images and/or the guide images (e.g., day, night, indoor, outdoor). The LUT may be retrieved from the LUT database 120, which may store multiple LUTs with each LUT corresponding to a certain type of scene. In certain embodiments, the input LUT may be a default LUT that is the same for each conversion of input images that are being converted to output images. The input LUT may include a range values for one or more color parameters, such as hue, intensity, brightness, and saturation.

In block 510, the processor, via the colorization logic 102, may transform the input LUT to generate an output LUT (e.g., a generated LUT) for each input image (or a subset of the input images) based on a matching guide image. The transformation/adjustment of the input LUT may include modifying some or all of the color parameters identified in the input LUT, such as hue, brightness, and other adjustments. The colorization logic 102 may iteratively adjust the input LUT applied to the input image to adjust the color of the input image until a difference between the color of the input image (as adjusted by the input LUT) and the color of the guide image is less than a threshold difference and/or based on a cost function (e.g., PSNR, SSIM). In an aspect, this iterative process may be performed via machine learning techniques.

In block 512, the processor, via the colorization logic 102, may generate an indication of the output LUT for each input image (or for a subset of the input images). The indication of the output LUTs may be displayed via the GUI described herein. For example, the GUI may display each LUT as a 3-dimensional cube with each axis of the cube representing a particular color parameter, such as hue, brightness, intensity, and saturation.

Figure 6:
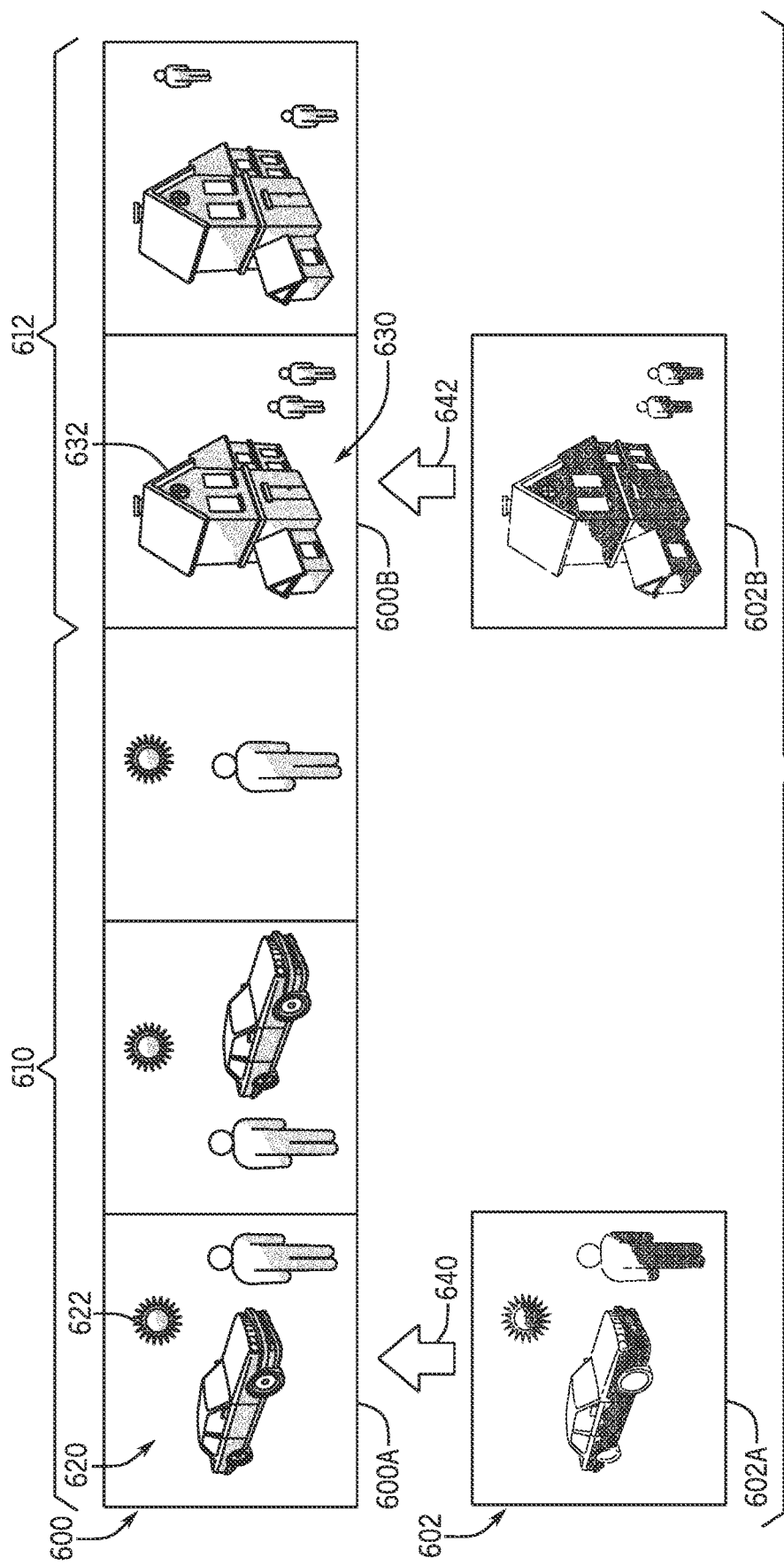
FIG. 6 is a block diagram depicting an embodiment of input images that may be matched to guide images by the colorization logic of FIG. 1, in accordance with one or more current embodiments.

FIG. 6 is a block diagram depicting an embodiment of input images 600 that may be matched to guide images 602 by the colorization logic 102 of FIG. 1. As illustrated, the input images 600 include a first group 610 associated with a first scene and a second group 612 associated with a second scene. The input images 600 may be sequential images (e.g., frames) of a video with sequential scenes (e.g., the first scene and the second scene). In certain embodiments, the colorization logic 102 may automatically sort the input images 600 into the first group 610 and the second group 612 based on parameters (e.g., characteristics) of the input images 600. For example, the colorization logic 102 may generally divide the input images into categorical groups based on parameters of the input images, such as types of scenes (e.g., day, night, indoor, outdoor), a position of the input image relative to other input images, inputs provided by a user, and other suitable parameters.

In the illustrated embodiment, the colorization logic 102 may identify the first three input images 600 as belonging to the first group 610 based on detection of features 620 in the first three input images 600, including the Sun 622. The colorization logic 102 may determine that the first three input images 600 are an outdoor daytime scene based on the features 620 including the Sun 622. Additionally, the colorization logic 102 may identify the next two input images 600 as belonging to the second group 612 based on detection of features 630 in the next two input images 600. The colorization logic 102 may determine that the next two input images 600 are an outdoor nighttime scene based on the features 630 including a house 632 and the absence of the Sun 622. The colorization logic 102 may also identify that the input images 600 are part of two different scenes based on differences between the features 620 and the features 630.

The colorization logic 102 may match the guide images 602 to the input images 600. For example, the colorization logic 102 may match a first guide image 602A to the first group 610 of the input images 600 and a second guide image 602B to the second group 612 of the input images 600. More specifically, the colorization logic 102 may match the first guide image 602A to a first input image 600A, as indicated by arrow 640, based on features 650 of the first guide image 602A matching the features 620 of the first input image 600A. Additionally, the colorization logic 102 may match the second guide image 602B to a fourth input image 600B, as indicated by arrow 642, based on features 660 of the second guide image 602B matching the features 630 of the fourth input image 600B.

After matching the guide images 602 to the input images 600, as described above, the colorization logic 102 may generate LUTs (and/or other color mapping logic) that adjust the color of the input images 600 to generally match the color of the guide images 602. Specifically, the colorization logic 102 may generate a first LUT for the first group 610 that converts the first group 610 of input images 600 into a first set of output images of the first scene. Additionally, the colorization logic 102 may generate a second LUT for the second group 612 that converts the second group 612 of input images 600 into a second set of output images of the second scene. The colorization logic 102 may provide the LUTs and/or the output images for display via the GUI described herein.

In certain embodiments, the input images 600 and the guide images 602 may be displayed via the GUI for viewing and interaction by a user. For example, after matching the guide images 602 to the input images 600, the GUI may display the input images 600 and the guide images 602 and may indicate the matches to allow the user to view and/or approve the matches. In some embodiments, the GUI may allow the user to provide the guide frames for each input image and/or to divide the input images 600 into categorical groups, such as the first group 610 and the second group 612, into scenes, and/or into types of images. After receiving the user inputs, the colorization logic 102 may proceed to generate the LUTs and/or the output images.

Figure 7:
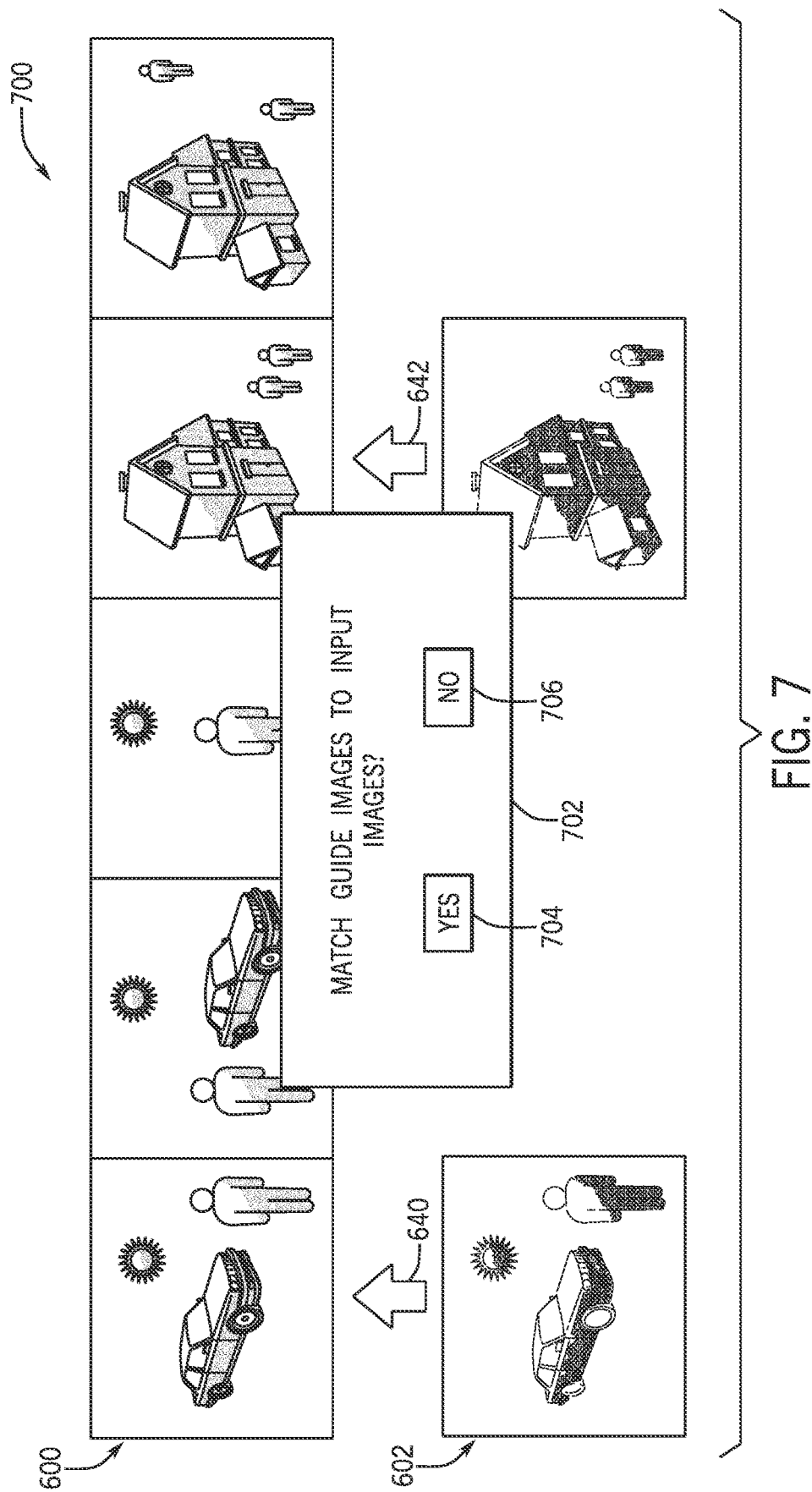
FIG. 7 is a block diagram of an embodiment of a graphical user interface of the system of FIG. 1 that may facilitate user interaction with the system of FIG. 1, in accordance with one or more current embodiments.

FIG. 7 is a block diagram of an embodiment of a GUI 700 of the system 100 of FIG. 1 that may facilitate user interaction with the system 100 of FIG. 1. The GUI 700 may the GUI described in reference to FIGS. 1-6 above. As illustrated, the GUI 700 is displaying the input images 600, the guide images 602, and the arrows 640 and 642 indicating suggested matches of the input images 600 and the guide images 602 (e.g., a first suggested match of the first guide image 602A to the first input image 600A and a second suggested match of the second guide image 602B to the fourth input image 600B). Additionally, the GUI includes a notification 702 requesting approval of suggested matches of the guide images 602 to the input images 600. A user may select a YES option 704 to approve the matches or a NO option 706. In response to receiving an indication that the YES option 704 is selected, the colorization logic 102 may proceed to generate the LUTs and/or the output images for the input images 600. In response to receiving an indication that the NO option 706 is selected, the colorization logic 102 may determine alternative matches of the guide images 602 to the input images 600, alternative guide images to match to the input images 600, alternative groupings of the input images 600, and other suitable determinations. As illustrated, the notification 702 is a pop-up window in the GUI 700. In some embodiments, the notification 702 may be an audible alert and/or another visual alert/prompt.

FIG. 8 is a flow diagram depicting an embodiment of a method 800 that may be performed by the colorization logic 102 of FIG. 1. While the method 800 is described using steps in a specific sequence, it should be understood that the present disclosure contemplates that the described steps may be performed in different sequences than the sequence illustrated, and certain described steps may be skipped or not performed altogether. In some embodiments, the method 800 may be implemented by executing instructions stored in a tangible, non-transitory, computer-readable medium, such as a memory device (e.g., one or more memory devices), using a processor (e.g., one or more processors).

In block 802, the processor, via the colorization logic 102, may receive input images, such as the input images 104 and/or the input images 300. The operation of block 802 may be similar to operation of block 202. In block 804, the processor, via the colorization logic 102, may receive guide images, such as the guide image 106 and/or the guide image 302. The operation of block 804 may be similar to operation of block 204. In block 806, the processor, via the colorization logic 102, may match the input images to the guide images. For example, the operation of block 806 may be similar to the method 400 described in reference to FIG. 4. In block 808, the processor, via the colorization logic 102, may generate LUTs that modify the color of the input images based on the guide images. For example, the operation of block 808 may be similar to the method 500 described in reference to FIG. 5.

In block 810, the processor, via the colorization logic 102, may receive other input images associated with the previous input images received at block 802. The other input images may be related to the previous input images and/or may be visually similar. For example, the previous input images and the other input images may be part of the same television series and belong to different episodes of the series. In another example, the previous input images and the other input images may be part of the same movie series but belong to different movies within the series. In certain embodiments, the colorization logic 102 may determine that the input images are related and part of the series but belong to different episodes/movies within the series.

In block 812, the processor, via the colorization logic 102, may apply the LUTs generated at block 808 to the other input images to generate other output images corresponding to the other input images. Continuing with the example of television or movie series, the LUTs generated for one episode/movie (e.g., for the previous input images received at block 802) may be used to adjust color in another episode/movie (e.g., for the other input images received at block 810). Accordingly, the colorization logic 102, and the system 100 generally, may facilitate adjusting color of the other input images by not having to create new LUTs. As such, the system 100 may reduce time and costs associated with producing output images associated with the other input images, such as the later episodes and movies in the series.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A non-transitory computer-readable medium comprising computer readable instructions, that when executed by one or more processors, causes the one or more processors to perform operations comprising:
   receiving a plurality of input images;
   receiving a guide image corresponding to at least one input image of the plurality of input images, wherein the guide image comprises additional colorization relative to the at least one input image;
   determining a threshold level of similarity based on a first type of the guide image, a second type of the at least one input image, a first amount of first features of the guide image, a second amount of second features of the at least one input image, or a combination thereof;
   matching the guide image to the at least one input image based on the threshold level of similarity;
   generating a color mapping logic configured to adjust a color of the at least one input image to match the additional colorization of the guide image; and
   outputting an indication of the color mapping logic.

2. The non-transitory computer-readable medium of claim 1, wherein the operations comprise generating one or more output images by applying, based upon the indication of the color mapping logic, the color mapping logic to one or more additional input images of the plurality of input images.

3. The non-transitory computer-readable medium of claim 1, wherein the operations comprise:
   applying the color mapping logic to other input images associated with the plurality of input images; and
   generating output images corresponding to the other input images based on the color mapping logic.

4. The non-transitory computer-readable medium of claim 3, wherein the plurality of input images correspond to a particular movie in a movie series or a particular episode in an episodic series, and wherein the other input images correspond to another movie in the movie series different from the particular movie or to another episode in the episodic series different from the particular episode.

5. The non-transitory computer-readable medium of claim 1, wherein matching the guide image to the at least one input image based on the threshold level of similarity comprises matching the guide image to the at least one input image based on the first features of the guide image and the second features of the at least one input image being within the threshold level of similarity.

6. The non-transitory computer-readable medium of claim 5, wherein the operations comprise identifying the first features of the guide image, identifying the second features of the at least one input image, determining the threshold level of similarity, or a combination thereof, via machine learning.

7. The non-transitory computer-readable medium of claim 1, wherein the color mapping logic comprises one or more lookup tables (LUTs), and wherein generating the one or more LUTs comprises iteratively adjusting, via machine learning, an input LUT until the color of the at least one input image matches the additional colorization of the guide image within a threshold color difference.

8. The non-transitory computer-readable medium of claim 7, wherein the operations comprise determining the threshold color difference using a peak signal-to-noise ratio (PSNR), structural similarity index (SSIM), or both.

9. A method of adjusting colorization of imagery, comprising:
   receiving a plurality of input images;
   determining one or more categorical groups of a plurality of categorical groups for each input image of the plurality of input images, wherein each categorical group comprises a type of scene;
   receiving a plurality of guide images corresponding to the plurality of input images, wherein the plurality of guide images comprise additional colorization relative to the plurality of input images;
   determining a guide image for each categorical group of the plurality of categorical groups that provides the additional colorization for the categorical group;
   generating, for each categorical group, one or more lookup tables (LUTs) configured to adjust colors of one or more input images to match the additional colorization of the guide image for the categorical group; and
   outputting an indication of the one or more LUTs.

10. The method of claim 9, wherein at least one guide image of the plurality of guide images corresponds to multiple input images of the plurality of input images.

11. The method of claim 9, wherein the plurality of categorical groups comprise a night scene, a day scene, an indoor scene, and an outdoor scene.

12. A system, comprising:
   one or more hardware processors; and a non-transitory memory storing instructions that, when executed by the one or more hardware processors, causes the one or more hardware processors to perform actions comprising:

receiving a plurality of input images;

receiving a guide image corresponding to at least one input image of the plurality of input images, wherein the guide image comprises additional colorization relative to the at least one input image;

generating a color mapping logic configured to adjust a color of the at least one input image to match the additional colorization of the guide image by iteratively adjusting, via machine learning, an input color mapping logic until the color of the at least one input image matches the additional colorization of the guide image within a threshold color difference; and outputting an indication of the color mapping logic.

13. The system of claim 12, wherein the actions comprise generating one or more output images by applying, based upon the indication of the color mapping logic, the color mapping logic to one or more additional input images of the plurality of input images.

14. The system of claim 12, wherein the actions comprise:
applying the color mapping logic to other input images associated with the plurality of input images; and
generating output images corresponding to the other input images based on the color mapping logic.

15. The system of claim 12, wherein the color mapping logic comprises one or more lookup tables (LUTs), and wherein the input color mapping logic comprises an input LUT.

16. The system of claim 12, wherein the actions comprise matching the guide image to the at least one input image based on first features of the guide image and second features of the at least one input image being within a threshold level of similarity.

* * * * *